(12) United States Patent
Pasternak

(10) Patent No.: US 6,190,191 B1
(45) Date of Patent: *Feb. 20, 2001

(54) ADAPTER AND SOCKET ASSEMBLY FOR A COMPACT FLUORESCENT LAMP

(75) Inventor: Barton A. Pasternak, Elkins Park, PA (US)

(73) Assignee: Angelo Brothers Company, Philadelphia, PA (US)

(*) Notice: Under 35 U.S.C. 154(b), the term of this patent shall be extended for 0 days.

This patent is subject to a terminal disclaimer.

(21) Appl. No.: 09/495,776

(22) Filed: Feb. 1, 2000

Related U.S. Application Data (63) Continuation of application No. 09/132,653, filed on Aug. 12, 1998, now Pat. No. 6,059,593.

(51) Int. Cl.[7] .............................. H01R 33/02; H01R 33/08
(52) U.S. Cl. ............................................. 439/236; 315/58
(58) Field of Search .................................... 439/232, 236, 439/238, 226, 76, 903, 646; 315/57, 58; 362/260, 296; 200/51.02, 51 R

(56) References Cited

U.S. PATENT DOCUMENTS

| | | | |
|---|---|---|---|
| D. 321,857 | 11/1991 | Blaisdell et al. | D13/137 |
| D. 362,733 | 9/1995 | Murata | D26/3 |
| 4,399,390 | 8/1983 | Oshita et al. | 315/101 |
| 4,495,443 | 1/1985 | Cummings | 315/58 |
| 4,596,433 * | 6/1986 | Oesterheld et al. | 439/236 |
| 4,623,823 * | 11/1986 | Engel | 315/58 |
| 4,713,019 | 12/1987 | Gaynor | 439/232 |
| 4,739,454 | 4/1988 | Federgreen | 362/133 |
| 4,936,789 | 6/1990 | Ugalde | 439/236 |
| 5,320,548 | 6/1994 | Schadhauser | 439/236 |
| 5,390,096 | 2/1995 | DeKleine et al. | 362/346 |
| 5,759,054 | 6/1998 | Spadafore | 439/236 |

FOREIGN PATENT DOCUMENTS 466808  1/1947  (CA) .

OTHER PUBLICATIONS

Rea, Mark S., Ph.D. Fies, Lighting Handbook, 8th ed., reprinted 1995, *Illuminating Engineering Society of North America*, New York, pp. 197–217.

* cited by examiner

*Primary Examiner*—Paula Bradley
*Assistant Examiner*—Antoine Ngandjui
(74) *Attorney, Agent, or Firm*—Seidel Gonda Lavorgna & Monaco, PC

(57) ABSTRACT

An assembly for use with a compact fluorescent lamp includes a socket and an adapter. The socket includes a housing having a top surface and a recess extending downward from the top surface toward the bottom end of the socket. The recess is shaped and dimensioned to receive the starter housing of the compact fluorescent lamp. Provided on the top surface are a plurality of spaced apart holes, each hole being positioned to receive one of the terminal pins of the fluorescent lamp. The adapter is designed to connect the compact fluorescent lamps having different types of base configurations with the socket. The adapter includes a base from which a starter housing and a plurality of terminal pins extend downward. The starter housing is positioned to be telescopically received by the recess of the socket. The starter housing is surrounded by the terminal pins that are positioned away from one another in order to be inserted in the spaced apart holes of the socket. In one embodiment, the base may include a recess for receiving the starter housing of the compact fluorescent lamp and a plurality of spaced apart holes. Each hole is positioned to receive one of the terminal pins of the fluorescent lamp. In another embodiment, the base may have attached thereto a secondary adapter for use with the fluorescent lamp.

9 Claims, 7 Drawing Sheets

ADAPTER AND SOCKET ASSEMBLY FOR A COMPACT FLUORESCENT LAMP

"This is a continuation of application Ser. No. 09/132,653, filed on Aug. 12, 1998, now U.S. Pat. No. 6,059,593 which is incorporated herein by reference in its entirety."

FIELD OF THE INVENTION

The present invention relates to an assembly for use with compact fluorescent lamps. In particular, the invention relates to a universal adapter and socket assembly for using different types of compact fluorescent lamps offered in the market.

BACKGROUND OF THE INVENTION

Compact fluorescent lamps are gaining popularity as replacements for incandescent lamps. Incandescent lamps are presently used in a variety of applications. Incandescent lamps are used as table lamps, desk lamps, ceiling lamps, and the like. Incandescent lamps have been popular due to their effectiveness in providing light. As a result of their effectiveness in providing light, incandescent lamps are frequently used on a continuous basis, sometimes being left on overnight or over the course of a number of days. The continuous use of incandescent lamps creates a problem.

Incandescent lamps consume a significant percentage of the world's energy. The energy consumed by incandescent lamps contributes to some form of pollution. The pollution is generated by the power companies that rely upon natural resources such as coal, as fuel to produce electricity. Due to the continuous use of incandescent lamps, more and more electricity must be generated. As a result, as power companies increase output to meet the demands for more electricity, the amount of the natural resources that are consumed and the amount of pollution generated by such power companies also increases.

To conserve energy, the environment and natural resources, compact fluorescent lamps have been designed as energy saving replacements for incandescent lamps. Typically, compact fluorescent lamps have a higher rated life than most incandescent lamps. A compact fluorescent lamp usually has a rated life between 10,000 and 20,000 hours in comparison to 750 to 1000 hours for incandescent lamps. Also, compact fluorescent lamps use only a fraction of the power normally needed to run an incandescent lamp of relatively the same intensity. By using only a fraction of the power, the costs associated with running a compact fluorescent lamp, in comparison to an incandescent lamp, is greatly reduced. Although the initial cost associated with converting from an incandescent lamp to a compact fluorescent lamp is more expensive than replacing a light bulb, the cost is more than compensated over the life of the compact fluorescent lamp. Accordingly, compact fluorescent lamps have proven to be an attractive cost effective and energy conscious replacement for incandescent lamps.

To benefit from the costs to be saved, manufacturers have designed and offered to consumers a variety of compact fluorescent lamps having different shapes and sizes. A typical compact fluorescent lamp includes a fluorescent tube that is connected to a base from which one or more terminal pins extend. The fluorescent tubes are manufactured having a variety of configurations. For instance, some fluorescent tubes have a dual U-shaped configuration while others have a circular or circline configuration.

Similar to the fluorescent tube, manufacturers have designed a variety bases having different pin configurations. The base is designed to support the fluorescent tubes and provide a means of electrical connection. Manufacturers have separated the variety of pin configurations into the following classifications: two pin configurations (commercially known as G23, GX23, and G24D bases), four-pin configurations (commercially known as GX32D and 2G11 bases), and quad pin configurations.

Finally, a post or housing also extends from the base, positioned intermediate the terminal pins. The housing, sometimes referred to as a "starter housing", is used to store the starter elements of the compact fluorescent lamp that are connected to the terminal pins. The starter housing also adds to the stability to the fluorescent lamp.

The wide range of bases having such a broad variety of pin configurations creates a problem for the consumer. In order to use the different types of compact flourescent lamps offered in the market, the consumer would have to purchase a lamp specifically designed for each classification of compact flourescent lamps offered in the market. Purchasing a different lamp for each compact flourescent lamp is costly.

In response to this problem, manufacturers have attempted to design adapters that can connect to the different types of compact flourescent lamps offered in the market. For example, U.S. Pat. No. 4,713,019 shows lamp holder sockets for use with compact flourescent lamps. The lamp holders include a housing having a series of channels to for receiving the terminal pins of the compact flourescent lamps. However, the holders shown in the '019 patent still require the consumer to purchase several different holders for use with different compact flourescent lamps. In other designs, manufactures have manufactured adapters for use with incandescent lamps. Designs of this sort are limited because as the popularity of compact flourescent lamps increases, the number of lamps specifically designed for use with compact flourescent lamps will also increase. As a result, the demand for lamps having sockets to adapt incandescent lamps for use with compact flourescent lamps will decrease.

Accordingly, there is a need in the art for a simple, yet effective socket and lamp assembly that will allow the consumer to enjoy the benefits of using compact flourescent lamps with relatively low costs. There is also a need in the art for an adapter that will permit the consumer to use two or more compact fluorescent lamps with a single lampholder. To be effective, the lamp assembly should be designed for use with bases having two, four or quad pin configurations.

To fill the foregoing needs, the present invention provides an apparatus and socket assembly for use with a variety of compact fluorescent lamps offered in the market. It is an object of this invention to provide a socket for use with compact fluorescent lamps. It is also an object of this invention to provide an adapter that will permit the consumer to use a variety of compact fluorescent lamps with a single socket. These and other objects and advantages of the present invention will be apparent from the drawings and from the description of the preferred embodiment.

BRIEF DESCRIPTION OF THE INVENTION

The present invention relates to an assembly for use with a compact fluorescent lamp. The assembly includes a socket and an adapter. The socket has an annular wall having a top surface and at least one edge defining its periphery. An opening extends downward from the top surface of the wall to define a cavity or recess for receiving a portion of the compact fluorescent lamp. A plurality of spaced part holes are provided on the top surface, each hole being positioned to receive one of the terminal pins of the compact fluorescent lamp. The spaced apart holes are connected to a switching assembly that is disposed within the socket to control the flow of electricity to the compact fluorescent lamp.

The adapter is designed to connect the socket to the compact fluorescent lamp. The adapter includes a base having a top surface and a bottom surface. An opening extends downward from the top surface to form a recess to receive a portion of the fluorescent lamp. The opening is surrounded by a plurality of spaced part holes that are provided on the top surface. Each hole is positioned to receive one of the terminal pins of the compact fluorescent lamp.

A plurality of terminal pins extend downwardly from the bottom surface of the adapter. Each terminal pin is positioned to be telescopically received in one of the spaced apart holes of the socket. In an alternate embodiment, the base may include a secondary adapter that is designed to electrically connect with the terminal pins of the compact fluorescent lamp.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
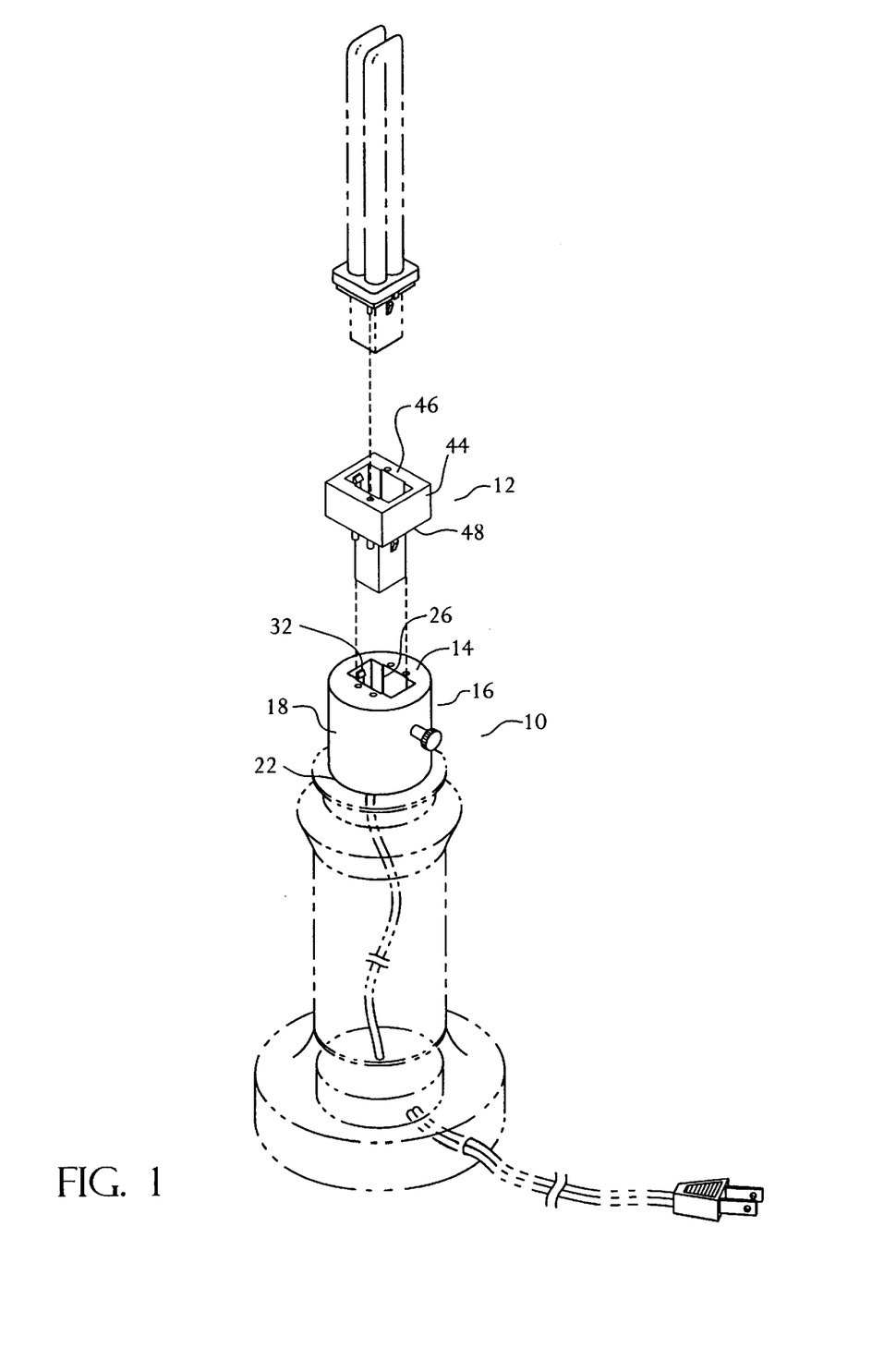
FIG. 1 is a perspective exploded view of an adapter and a socket for using a compact fluorescent lamp as contemplated by the present invention.

In the drawings, where like numerals identify like elements, there is shown various embodiments of an adapter and socket assembly for use with a variety of compact fluorescent lamps offered in the market. As shown in FIG. 1, the assembly generally includes a socket which is designated by the number 10 and an adapter 12. The socket 10 is designed to engage a typical compact fluorescent lamp. The compact fluorescent lamp vill have a fluorescent tube that is attached to a base. The base includes a plurality of terminal pins that extend downwardly away from the fluorescent tube. A post or starter housing also extends from the base to store the starter elements of the fluorescent lamp. In line with traditional construction, a pair of molded detents are attached to opposite sides of the starter housing to secure the fluorescent lamp within the socket 10.

Figure 2:
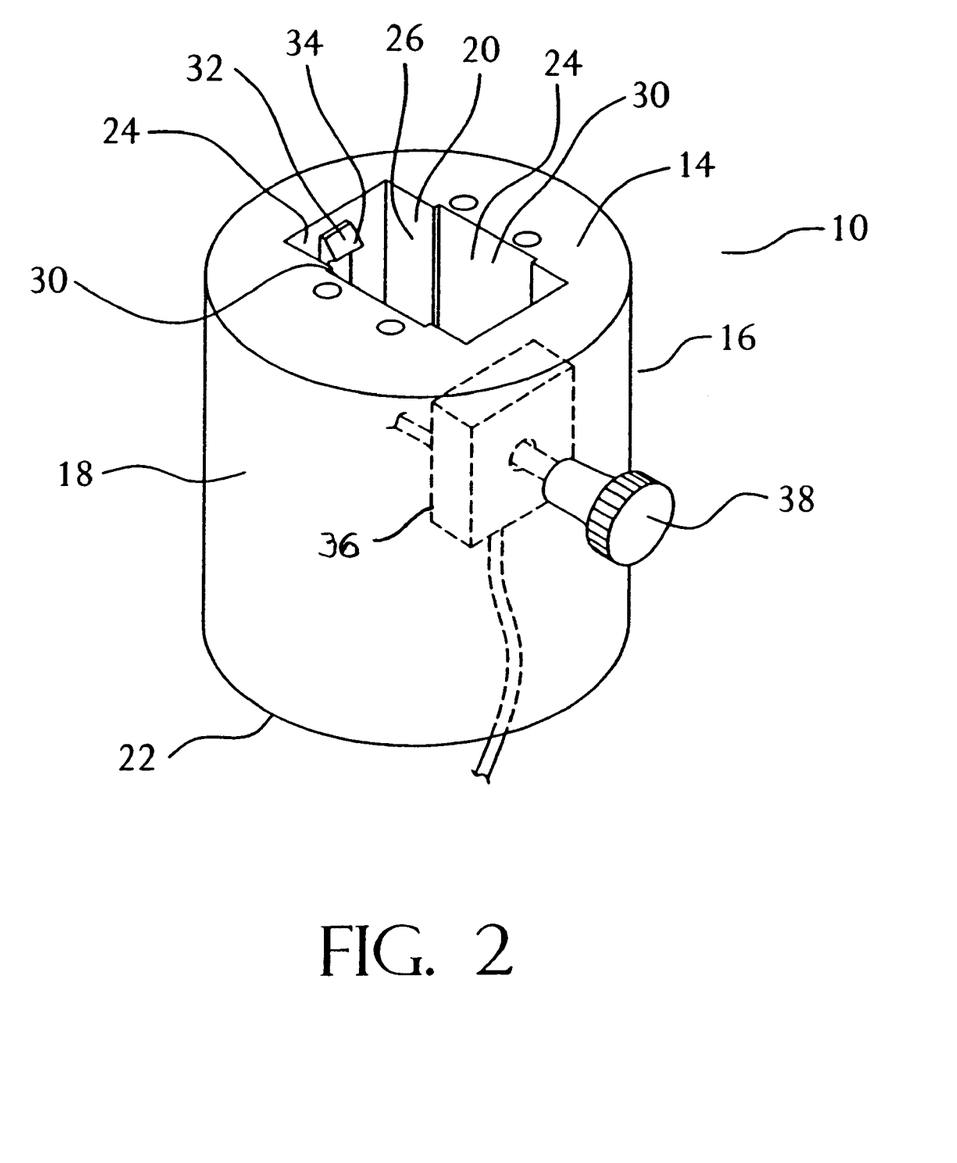
FIG. 2 is a perspective view of the socket of the present invention shown in FIG. 1.

As is more clearly seen in FIG. 2, the socket 10 includes a top surface 14 and a housing 16. The housing 16 is annular having an outer surface 18 and an inner surface 20. The outer surface 18 generally defines the outer periphery of the housing 16 and extends downwardly from the top surface 14 toward the bottom end 22 of the socket 10. The inner surface 20 is positioned radially inward from the outer surface 18 and also extends downward from the top surface 14. The distance between the outer surface 18 and the inner surface 20 generally defines the thickness of the top surface 14.

As further illustrated in FIG. 2, the inner surface 20 is defined by a plurality of sides 24 that are joined to each other at the corners to form a recess 26 or cavity. The recess 26 extends below the top surface 14 and terminates in a floor 28 that is positioned above the bottom end 22 of the socket 10. (See FIG. 4). The recess 26 should be deep enough to substantially receive the starter housing of the fluorescent lamp that extends from the base. As further illustrated in FIG. 2, the recess 26 includes a pair of opposed grooves 30 that are provided to help align the fluorescent lamp when it is inserted into the socket 10. Each groove 30 extends downwardly from the top surface 12 to the floor 28 of the recess 26. The grooves 30 are formed to receive an oppositely formed member that projects from the side of the starter housing of the fluorescent lamp. The groove 30 is optional and can be eliminated without impacting upon the performance of the socket 10.

It is contemplated that the recess 26 may have any configuration. For instance, the recess 26 may be advantageously cylindrical to accommodate a substantially cylindrically shaped post or housing. It should be understood by those of ordinary skill in the art that the cross-section of the recess 26 will be slightly larger than the cross-section of the starter housing so that the fluorescent lamp may be easily, but firmly inserted into and removed from the socket 10 without causing damage.

Figure 3:
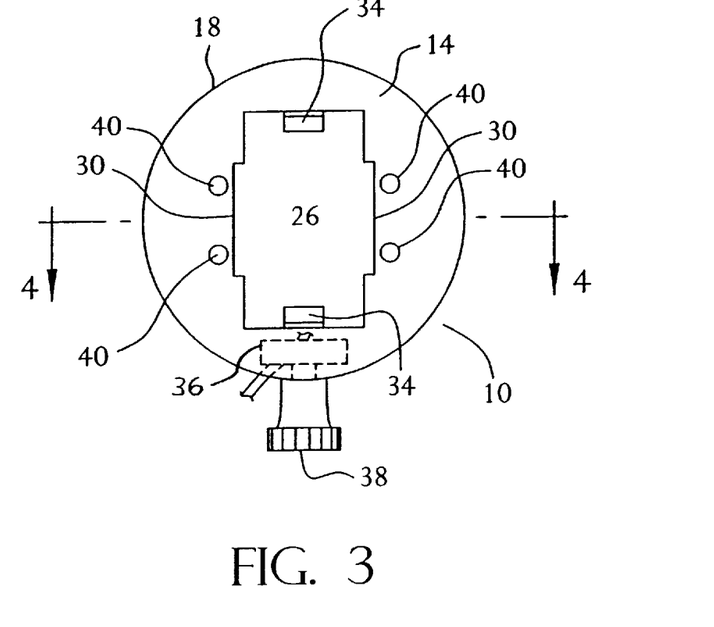
FIG. 3 is a top plan view of the socket of the present invention shown in FIG. 2.

A series of hooks 32 are formed on the inner surface 20 of the recess 26 to engage the detents of the fluorescent lamp. As shown in FIGS. 2 and 3, the hooks 32 are positioned on opposite sides 24 of the recess 26 to engage each of the detents of the fluorescent lamp. Each hook 32 projects outward from its attached side 24 and includes a ramp 34 that tapers upwardly to a vertex. When the fluorescent lamp is inserted into the socket 10, the detents of the fluorescent lamp will slide along each ramp 34 until the fluorescent lamp snaps in place. The hooks 32 and detents form a locking mechanism or means to ensure that the fluorescent lamp remains securely seated within the recess 26 of the socket 10. It is contemplated that other forms of locking mechanisms may be used consistent with the spirit and purpose of the present invention.

Turning now to FIG. 3, there is shown a switch assembly 36 for the socket 10. The switch assembly 36 is provided within the housing 14 as a means to control the flow of electricity to and within the socket 10. The switch assembly 36 includes a switching means that is operatively attached to a knob 38 that projects outward from a hole in the outer surface 16 of the housing 14. The knob 38 may be rotated clockwise to its "on" or "off" position relative to the electricity that may flow to the socket 10. In keeping with the present invention, the switching means can be replaced by other switches such as a push button switch, a pivot switch, a dimmer or the like. Switches of this sort may be operated manually or by electronically controlled devices. The switching means and switch assembly 36 are available in today's market from a number of manufacturers having commonly recognized configurations.

Figure 4:
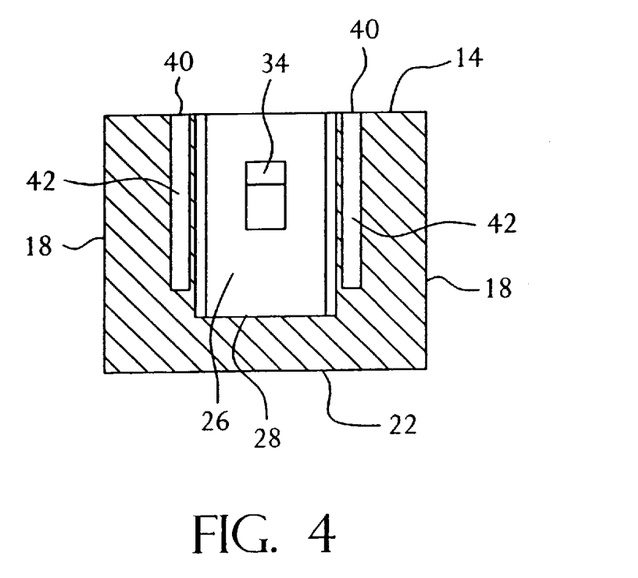
FIG. 4 is a sectional view of the socket of the present invention shown in FIG. 3, taken along line 4—4.

As shown in FIG. 3, a series of holes 40 are provided on the top surface 12 of the socket 10. The holes 40 are spaced part from each other to coincide with the relative spacing between and among the terminal pins of the fluorescent lamp. As depicted in FIG. 3, the holes 40 are positioned around the recess 26, intermediate the outer surface 18 and the inner surface 20 of the socket 10. As best seen in FIG. 4, each hole 40 extends below the top surface 12 toward the bottom end 22 of the socket 10 and is wide enough to receive each of the terminal pins of the fluorescent lamp. Provided within each hole 40 is a suitable form of conductive material or other electricity conducting means to firmly grasp each of the terminal pins. The hole 40 and conductive means combine to form a channel 42 for electrically engaging the terminal pins. Once the terminal pins are nested within the channel 42, electricity can flow from the socket 10, through the conductive material and into the fluorescent lamp.

It should be understood by those of ordinary skill in the art that the socket 10 may be connected to a typical lamp holder that may be used as a table or desk lamp. The socket 10 may be formed using suitable thermoplastic material known in the art. The socket 10 may generally include a line cord that extends from its bottom end 18 and connects to a plug having a pair of male prongs. The prongs are adapted to be inserted to a typical female AC electrical outlet. The lamp holder, line cord, and plug are available in the market from a number of manufacturers and do not form any significant part of the present invention. Accordingly, no further discussion of these parts is necessary.

Figure 5:
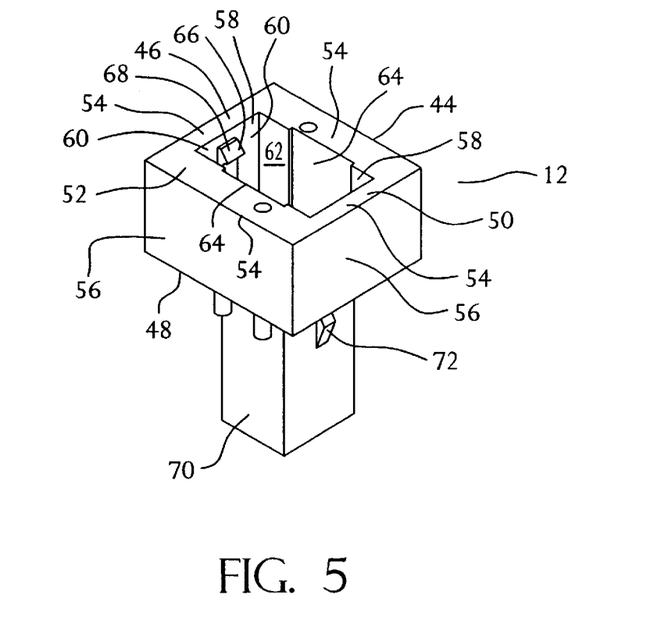
FIG. 5 is a perspective view of an adapter of the present invention shown in FIG. 1.

Turning now to FIG. 5, there is shown a perspective view of the adapter 12 as contemplated by the present invention. The adapter 12 is provided for use with the socket 10. As illustrated in FIG. 5, the adapter 12 includes a substantially rectangular base 44 having a top surface 46 and a bottom surface 48. The base 44 is bordered by at least one edge 50 that defines its outer periphery. The base 44 includes a housing 52 having a plurality of walls 54. Each wall 54 is connected at the corners and extends downward from the top surface 46 toward the bottom surface 48 of the adapter 12.

Wall 54 includes an outer surface 56 and an inner surface 58. The distance between the outer surface 56 and the inner surface 58 further defines the relative thickness of the housing 52. In the embodiment shown in FIG. 5, the inner surface 58 has a plurality of sides 60 that are joined to each other at the corners to form a recess or cavity 62.

The recess 62 serves the same purposes as the recess 62 of the socket 10. Accordingly, the recess 62 should be large enough to substantially but firmly receive the starter housing of the fluorescent lamp. Provided within the recess 62 are a pair of opposed grooves 64 that help align the compact fluorescent lamp when it is inserted. Each groove 64 extends downwardly from the top surface 46 to the floor of the recess 62. The grooves are formed to receive an oppositely formed member that projects from the side of the starter housing of the compact fluorescent lamp. The grooves 64 are optional and can be eliminated.

A pair of hooks 66 are provided within the recess 62 of the adapter 12. As shown in FIG. 5, the hooks 66 are positioned to engage the detents of the flourescent lamp. Each hook 66 includes a ramp 68 that tapers outwardly from the inner surface 58 to its vertex. When the flourescent lamp is inserted, the detents will slide upwardly along each ramp 68 until the flourescent lamp snaps in place. The hooks 66 and detents of the fluorescent lamp serve as a locking mechanism or a means to ensure that the fluorescent lamp remains securely, positioned within the adapter 12. Other locking mechanisms or means may be used within the scope of the present invention.

A post 70, commonly referred to as a starter housing, extends downward from the bottom surface 48 of the base 44 toward the recess 26 of the socket 10. As shown in FIG. 5, the post 70 is substantially rectangular having four sides that are joined to one another at the corners. The post 70 is positioned inward of the outer edge 50 of the base 44 so that the adapter 12 will have a generally T-shaped configuration. The post 70 may be used to store the electrical components of the adapter 12 and provide stability within the socket 10 once the adapter 12 is inserted.

It will be appreciated by those of ordinary skill in the art that the post 70 may have a variety of shapes and sizes, depending upon the configuration of the recess 26 of the socket 10 or the electrical components it may be used to store. For instance, the post 70 may have a cylindrical configuration that matches a substantially cylindrically shaped recess 26. The post 70 may also be used as a means to draw the electricity from the socket 10 by having some form of conductive material provided therein. It is contemplated, that the post may be used in a similar fashion to a terminal pin to draw electricity to the flourescent lamp.

As shown in FIG. 5, detents 72 are positioned on opposite sides 74 of the block 70, similar to the detents that are formed on the compact fluorescent lamp. Each detent 72 is positioned to slidably engage in locking fashion the hooks 32 formed within recess 26. The detents 72 are part of the locking mechanism that is used to maintain he adapter 12 is firmly secured within the socket 10.

Figure 6:
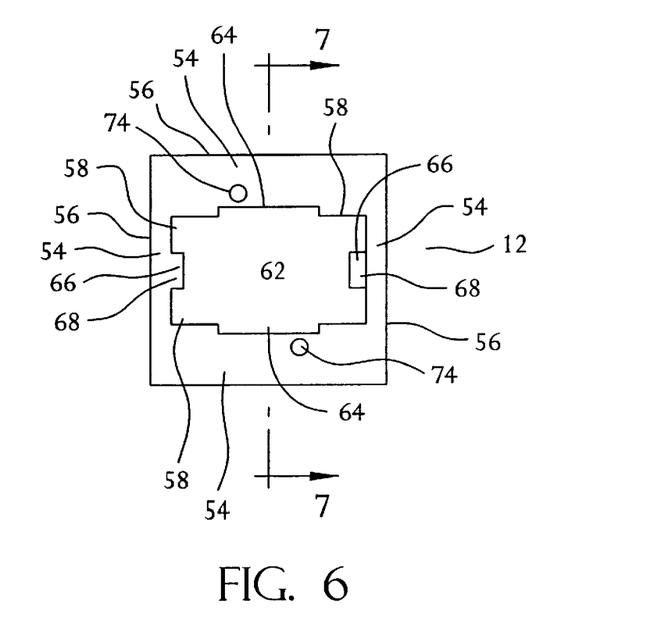
FIG. 6 is a top plan view of the adapter of the present invention shown in FIG. 5.
Figure 7:
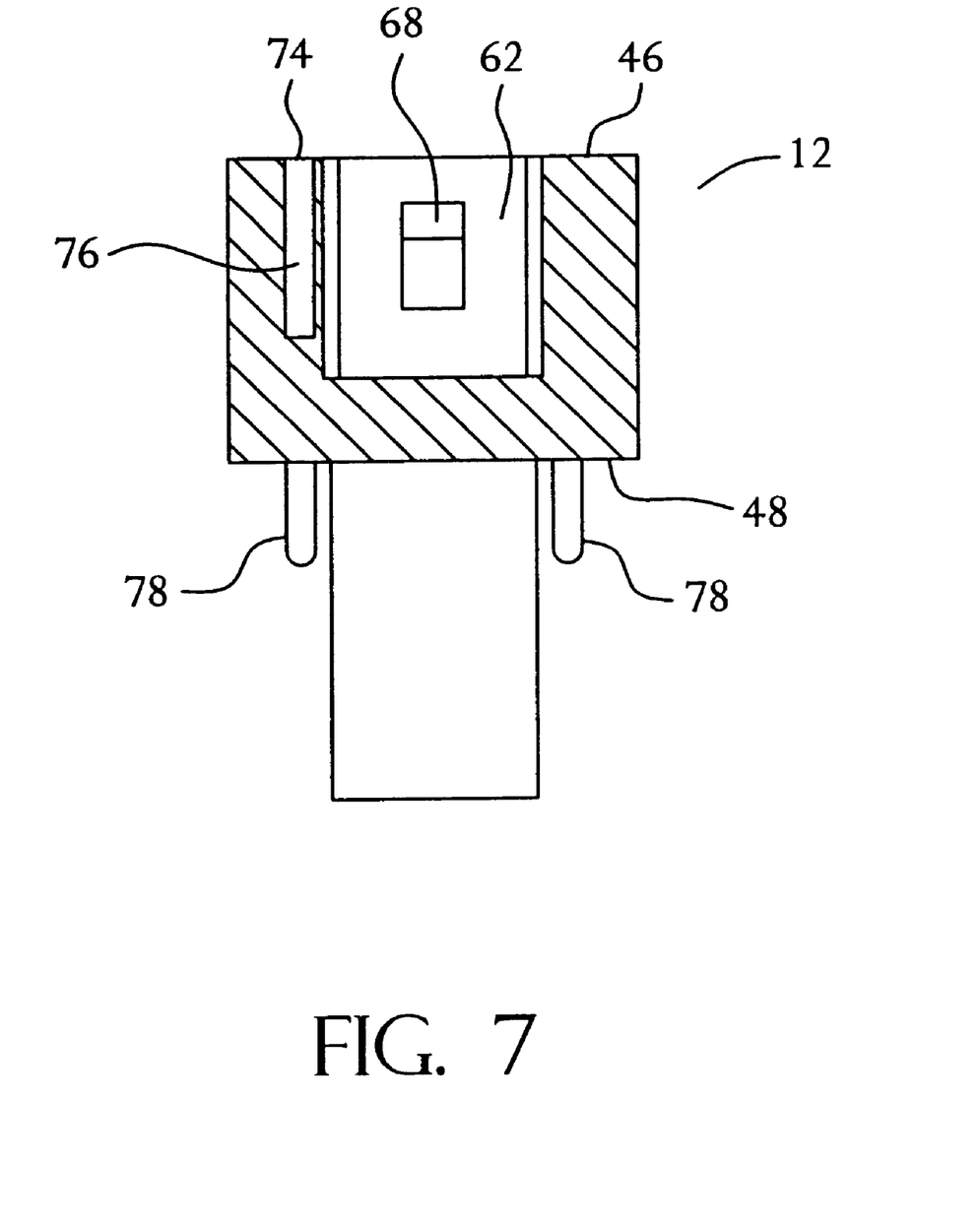
FIG. 7 is a sectional view of the adapter of the present invention shown in FIG. 6, taken along line 7—7.

Turning now to FIG. 6, there is shown a plurality of holes 74. The holes 74 are positioned on the top surface 46 of the adapter 12 to receive at least one of the terminal pins of the fluorescent lamp. Provided within each hole 74 is a suitable form of conductive material or other conducting means to firmly grasp each of the terminal pins of the fluorescent lamp. As best illustrated in FIG. 7, the combination of the hole 74 and the conductive material forms a channel 76 that projects downward to the bottom end 48 of the base 44. Once the terminal pins are nested within the channel 76, electricity can flow into the fluorescent lamp to illuminate the fluorescent bulbs.

Disposed within the adapter 12 is a means for providing electricity to the fluorescent lamp. In the preferred embodiment shown in FIG. 7, the electricity means includes a series of terminal pins 78 that are electrically connected to a plurality of spaced apart holes 74. The terminal pins 78 extend downward from the bottom surface 48 of the base 44 toward the socket 10. The terminal pins 78 are spaced away from one another to coincide with the relative position and spacing between and among the holes 40 provided the socket 10. When the adapter 12 is assembled, the terminal pins 78 will be telescopically received by each of the holes 40. Once inside, the terminal pins 78 will be firmly, grasped by the conductive means provided within the holes 40. Thereafter, electricity may flow from the socket 10 to the terminal pins 78 to illuminate the fluorescent tubes.

Figure 8:
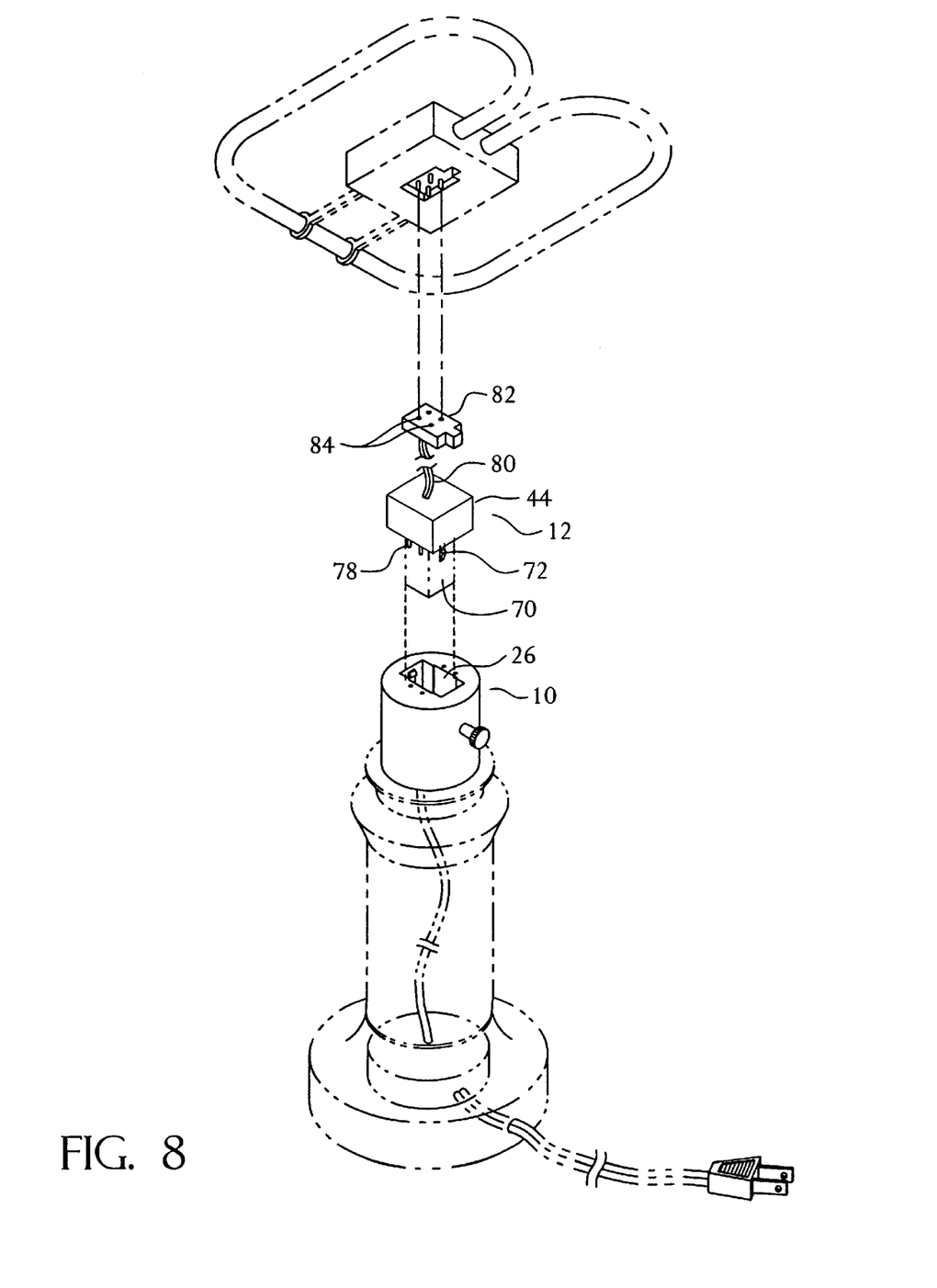
FIG. 8 is a perspective exploded view of another embodiment of the present invention.

Turning now to FIG. 8, there is shown an alternative embodiment of the present invention. As shown, the adapter 12 includes a substantially solid base 44 having a top surface 46 and at least one edge defining its outer perimeter. In this embodiment, the electricity conducting means of the adapter 12 includes a line cord 80 or wire that is connected to a secondary or auxiliary adapter 82. The line cord 80 has one or more wires that are electrically connected to each of the terminal pins of the adapter 12 to permit electricity to flow to the fluorescent lamp. The secondary adapter 82 includes a plurality of holes 84 or channels to receive at least one of the terminal pins of the fluorescent lamp.

Figure 9:
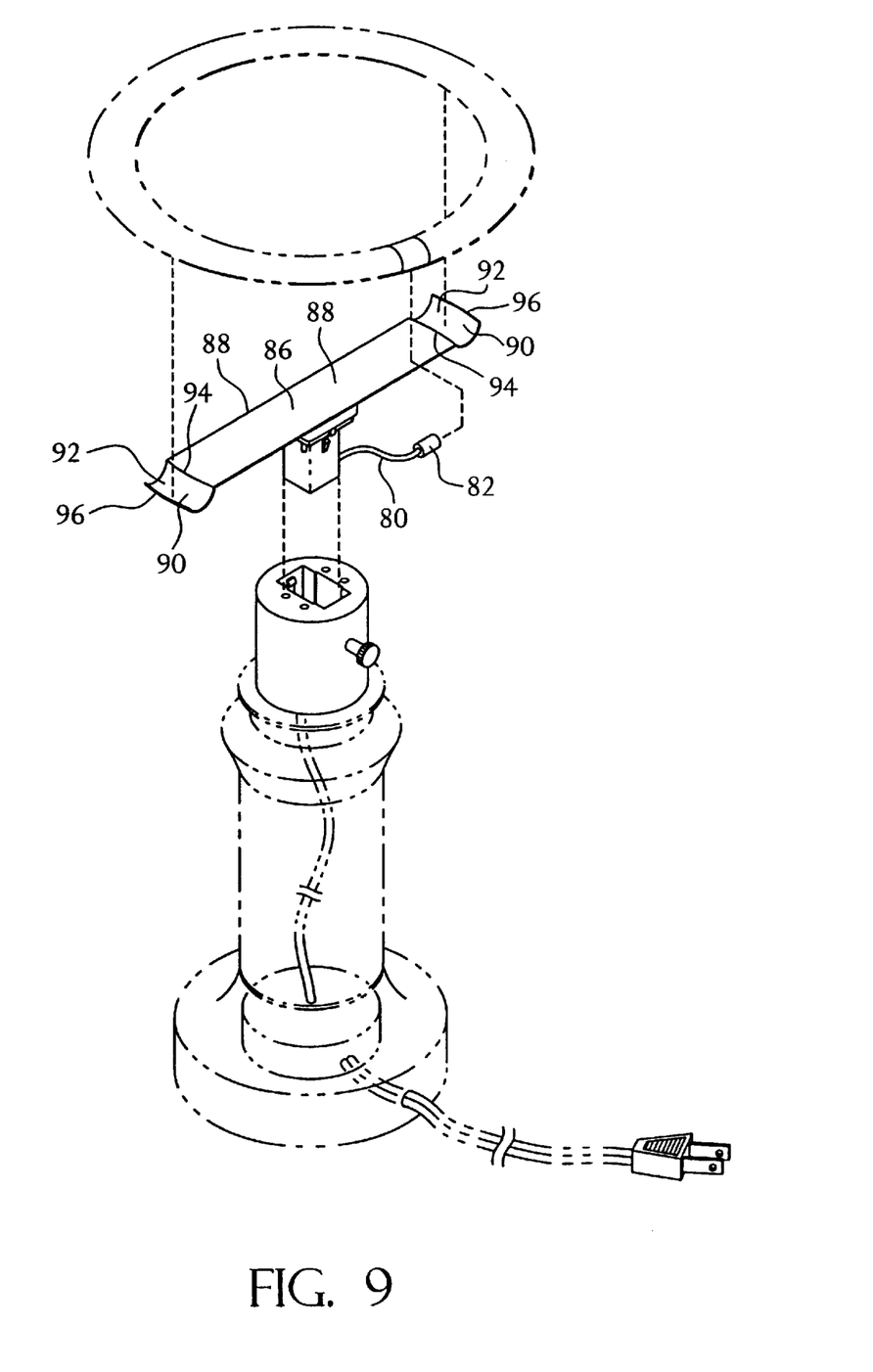
FIG. 9 is a perspective exploded view of another embodiment of the present invention.

FIG. 9 shows a further embodiment of the present invention. The adapter 12 includes a support member 86 attached to the top surface 46 of the base 44. The support member 86 is designed to support a substantially circular fluorescent lamp and includes a pair of arms 88 extending outwardly from one another relative to the central vertical axis of the adapter 12. Each arm 88 includes a U-shaped flange 90 that defines a recess 92 to firmly grasp the fluorescent tube. The inner edges 94 of the flange and outer edges 96 of the flange 92 are slightly curved having a radius that is substantially the same as that of the circular fluorescent lamp. The arms 88 and flange 90 are made of resilient material to bend flexibly and to apply enough reactive force to support the fluorescent lamp.

The electricity conductive means of the adapter 12 shown in this embodiment also includes the line card 80 and the secondary adapter 82. The secondary adapter 82 includes the plurality of holes 82 that are designed to electrically connect to the terminal pins of the circular fluorescent tube.

The invention as shown and described above simplifies the use of the compact fluorescent lamps that are available in the market. As shown in FIG. 1, the socket 10 is designed to receive a typical compact fluorescent lamp having four basic parts: a fluorescent tube, a base, terminal pins, and a post. Typically, the fluorescent tube is connected at one end to the base from which the terminal pins and the post extend. The fluorescent tube may have a U-shaped configuration (as illustrated in FIG. 1) or may have other configurations as illustrated in FIGS. 8 and 9, respectively. Various size fluorescent tubes are manufactured and sold by today's fluorescent lamp manufacturers each of which include different size bases and terminal pin configurations.

As shown in each illustration, the combination of the socket 10 and the adapter 12 allows the consumer to use a variety of compact fluorescent lamps. The socket 10 may be embodied in other configurations other than an annular configuration as illustrated in FIGS. 1, 8 and 9. Also, the holes 40 that are provided on the top surface 12 may vary in number depending largely upon the number of terminal pins that extend from the base of the compact fluorescent lamp. For example, the socket 10 may include a single hole 40 for bases having a slimline or single pin configuration. It is contemplated that other sockets and pin configurations may be used with the present invention.

The apparatus shown in FIGS. 1, 8 and 9 is easily assembled. The apparatus is assembled by inserting the adapter 12 into the socket 10 followed by the fluorescent lamp. The terminal pins of the adapter 12 will slide into each of the holes 40 of the socket 10. The adapter 12 will be telescopically received by the recess 26 of the socket 10. The adapters 12 should be pushed in far enough so that the bottom surface of each base 44 will rest on top of the top surface 12 of the socket 10.

Accordingly, the present invention fills the need for providing a universal apparatus that permits different compact fluorescent lamps to be used with one lamp assembly. Each of the adapters 12 described above may be used with the same socket. Use of the adapters eliminates the need for a separate socket for each of the different types of base configurations for compact fluorescent lamps presently offered in the market. The adapter 12 and the socket 10 provide the consumer with flexibility in choosing a particular type of compact fluorescent lamp.

The present invention may be embodied in other specific forms without departing from the spirit or essential attributes thereof and, accordingly, reference should be made to the appended claims, rather than to the foregoing specification, as indicating the scope of the invention.

We claim:

1. In a fluorescent light assembly having a compact fluorescent lamp, the compact fluorescent lamp having a fluorescent light bulb connected to a common base, a series of terminal pins extending from the base, a molded post extending from the base intermediate the series of terminal pins, the molded post including at least two opposed detents, the assembly comprising:

a socket having
a housing defined by a top surface,
a recess extending below the top surface to receive the molded post of the fluorescent lamp, a series of holes provided on the top surface, each of the holes positioned to receive at least one of the terminal pins of the fluorescent lamp, a locking means having at least one pair of opposed hooks, a switch for controlling the flow of electricity to the socket, an adapter for connecting with the socket, the adapter comprising a base for supporting the fluorescent lamp having a top surface and a bottom surface, the bottom surface facing the socket, a series of terminal pins extending downward from the bottom surface of the base, a post extending downward from the bottom surface of the base positioned intermediate the series of terminal pins, and conductive means provided within the base for providing electricity to the terminal pins of the fluorescent lamp.

2. The assembly as claimed in claim 1, said adapter further comprising a series of opposed detents provided on the post for releasably engaging each of the hooks of the locking means of the socket.

3. The assembly as claimed in claim 1, wherein the base further comprises a recess shaped and dimensioned for receiving the fluorescent lamp and a pair of opposed hooks for releasably engaging each of the detents of the post of the fluorescent lamp.

4. The assembly as claimed in claim 1, wherein the conductive means comprises a series of hole provided on the top surface of the base, each hole being positioned away from one another for receiving each of the terminal pins of the fluorescent lamp so that electricity may flow to the fluorescent tube.

5. The assembly as claimed in claim 1, wherein the conductive means further comprises a line cord and a secondary adapter, the line cord connected at one end with at least one of the terminal pins extending from the base and connected an opposite end to the secondary adapter, the secondary adapter having a socket, the socket including a series of holes for receiving the terminal pins of the fluorescent lamp so that electricity may flow to the fluorescent tube.

6. The assembly as claimed in claim 1, wherein the base further comprises a central vertical axis and a pair of support members extending outwardly from the vertical axis for supporting a substantially curved fluorescent tube.

7. The assembly as claimed in claim 6, wherein each support member of the base includes a U-shaped flange having a recess, the flange being curved to conform with the configuration of the fluorescent tube.

8. An interchangeable assembly for connecting a compact fluorescent lamp, the fluorescent lamp having a fluorescent tube electrically connected to a base from which a terminal pin extends and a guide post having at least one pair of oppositely attached molded detents, the assembly comprising:
- a socket comprising
  - a housing having a top surface,
  - a hole that extends downward from the top surface, the hole being provided to receive the terminal pin of the fluorescent lamp,
  - a recess extending downward form the top surface to receive the guide post of the fluorescent lamp,
- an adapter to connect to the socket, the adapter comprising
  - a base having a top surface and a bottom surface
  - a terminal pin to be received in the hole of the socket,
  - a starter housing projecting downward from the bottom surface for inserting into the recess of the socket, and
- an auxiliary adapter to electrically connect the fluorescent tube to the adapter, the auxiliary adapter having a hole to connect to the terminal pin of the fluorescent tube.

9. An assembly for use with a compact fluorescent lamp, the compact fluorescent lamp having a fluorescent tube electrically connected to a base from which a plurality of terminal pins extend generally downward, and a guide post having at least one pair of oppositely attached molded detents, the assembly comprising:
- a socket having a housing, the housing having a top surface and at least one edge defining a periphery,
- an opening extending downward from the top surface of the housing for receiving at least a portion of the fluorescent lamp,
- a hole provided on the top surface of the housing for receiving at least one of the terminal pins of the fluorescent lamp,
- a switching assembly disposed within the socket to control the flow of electricity to the fluorescent lamp, and
- an adapter to connect the socket with the fluorescent lamp, the adapter including
  - a base having a top surface and a bottom surface,
  - a plurality of terminal pins extending downward from the bottom surface, wherein at least one of the terminal pins is to be received by the hole of the socket, and
  - a starter housing projecting downward from the bottom surface.

* * * * *